United States Patent
Tian et al.

(10) Patent No.: US 12,195,895 B2
(45) Date of Patent: Jan. 14, 2025

(54) BRAIDED COMPOSITE PRODUCTS COMPRISING THERMOPLASTIC MATERIAL

(71) Applicant: The Boeing Company, Chicago, IL (US)

(72) Inventors: Jacquelynn Xueting Tian, Melbourne (AU); Christopher Alan Howe, Albert Park (AU); Adrian Paul Mouritz, Melbourne (AU); Michelle Louise Gee, Bundoora (AU); Stuart Arthur Bateman, Melbourne (AU)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 18/048,701

(22) Filed: Oct. 21, 2022

(65) Prior Publication Data

US 2024/0133089 A1 Apr. 25, 2024
US 2024/0229309 A9 Jul. 11, 2024

(51) Int. Cl.
*D04C 1/02* (2006.01)

(52) U.S. Cl.
CPC ............ *D04C 1/02* (2013.01); *D10B 2101/12* (2013.01); *D10B 2505/12* (2013.01)

(58) Field of Classification Search
CPC ............... D04C 1/02; D04C 1/04; D04C 1/06
See application file for complete search history.

(56) References Cited

U.S. PATENT DOCUMENTS

| | | | | |
|---|---|---|---|---|
| 4,067,210 A * | 1/1978 | Arons | ..................... | D04B 21/14 139/420 R |
| 4,559,862 A * | 12/1985 | Case | ....................... | D04C 1/02 87/8 |
| 5,048,441 A * | 9/1991 | Quigley | ................... | B32B 5/26 428/113 |
| 5,127,783 A * | 7/1992 | Moghe | ................. | F16B 33/006 411/908 |
| 5,320,696 A * | 6/1994 | McConnell | .......... | B29C 53/845 87/9 |
| 5,419,231 A | 5/1995 | Earle, III et al. | | |
| 5,468,327 A * | 11/1995 | Pawlowicz | .......... | B29B 15/122 425/114 |

(Continued)

FOREIGN PATENT DOCUMENTS

| | | |
|---|---|---|
| EP | 0706876 B1 | 7/2000 |
| EP | 3225900 A1 | 10/2017 |
| WO | 2019068813 A1 | 4/2019 |

OTHER PUBLICATIONS

Extended European Search Report, dated May 10, 2024, regarding EP Application No. 23196336.4, 10 pages.

(Continued)

*Primary Examiner* — Bao-Thieu L Nguyen
(74) *Attorney, Agent, or Firm* — Yee & Associates, P.C.

(57) ABSTRACT

A braided carbon structure and methods of forming and processing are presented. The braided carbon structure comprises axial tows comprising carbon filaments; braid tows at a braid angle relative to the axial tows, the braid tows comprising carbon filaments; and thermoplastic material within at least one of the axial tows or the braid tows, wherein the thermoplastic material makes up less than 40 of each of the at least one of the axial tows or the braid tows.

20 Claims, 13 Drawing Sheets

(56) References Cited

U.S. PATENT DOCUMENTS

| | | | | |
|---|---|---|---|---|
| 5,580,626 | A * | 12/1996 | Quigley | D04C 1/06 |
| | | | | 428/113 |
| 7,566,376 | B2 * | 7/2009 | Matsuoka | B29C 53/8016 |
| | | | | 156/149 |
| 7,581,479 | B2 * | 9/2009 | Gessler | D04C 1/02 |
| | | | | 87/13 |
| 9,174,393 | B2 * | 11/2015 | Bartel | B29C 70/462 |
| 10,562,262 | B2 | 2/2020 | Howe et al. | |
| 10,940,648 | B2 | 3/2021 | Evans et al. | |
| 11,873,590 | B1 * | 1/2024 | Williams | D04C 1/02 |
| 2005/0077643 | A1 * | 4/2005 | Matsuoka | F17C 1/16 |
| | | | | 264/258 |
| 2014/0044965 | A1 * | 2/2014 | Linow | D04H 3/04 |
| | | | | 156/380.9 |
| 2014/0230634 | A1 * | 8/2014 | Nakai | D07B 1/02 |
| | | | | 87/8 |
| 2015/0217508 | A1 * | 8/2015 | Rossi | D04C 1/06 |
| | | | | 428/80 |
| 2018/0343962 | A1 * | 12/2018 | Bruce | A43B 1/04 |
| 2018/0343963 | A1 * | 12/2018 | Bruce | D04C 1/06 |
| 2018/0368506 | A1 * | 12/2018 | Bruce | B29D 35/126 |
| 2020/0139645 | A1 * | 5/2020 | Ogale | B29C 53/60 |
| 2021/0001564 | A1 * | 1/2021 | Ogale | B29C 65/3656 |
| 2021/0129395 | A1 * | 5/2021 | Sjostedt | B29B 15/12 |

OTHER PUBLICATIONS

Partial Eureopean Search Report, dated Mar. 26, 2024, regarding EP Application No. 23196336.4, 10 pages.

\* cited by examiner

BRAIDED COMPOSITE PRODUCTS COMPRISING THERMOPLASTIC MATERIAL

BACKGROUND INFORMATION

1. Field

The present disclosure relates generally to forming composite materials and more specifically to manufacturing braided composite materials.

2. Background

Composite materials are strong, light-weight materials created by combining two or more constituent materials. For example, a composite material may include reinforcing fibers bound in polymer resin matrix. The fibers can take the form of a unidirectional tape, woven cloth or fabric, or a braid. A braid typically has either a tri-axial or bi-axial configuration, and can come as a sleeve, broad good or preform.

Composites have undesirably low through-thickness mechanical properties (e.g. fracture toughness). Each form of composite material differs in mechanical performance. Braided composites generally have lower in-plane mechanical properties compared to tape and woven fabric composites.

Therefore, it would be desirable to have a method and apparatus that takes into account at least some of the issues discussed above, as well as other possible issues.

SUMMARY

An embodiment of the present disclosure provides a braided carbon structure. The braided carbon structure comprises axial tows comprising carbon filaments; braid tows at a braid angle relative to the axial tows, the braid tows comprising carbon filaments; and thermoplastic material within at least one of the axial tows or the braid tows, wherein the thermoplastic material makes up less than 40% of each of the at least one of the axial tows or the braid tows.

Another embodiment of the present disclosure provides a method of forming a braided composite product. Carbon filaments and thermoplastic filaments are braided together to form a braided carbon structure. At least one of heat or pressure is applied to the braided carbon structure to form a braided carbon preform. The braided carbon preform is resin infused to form the braided composite product.

Yet another embodiment of the present disclosure provides a method of forming a braided composite product. Axial tows and braid tows are braided into a braided carbon structure. At least one of the axial tows or the braid tows comprises thermoplastic filaments. The thermoplastic filaments comprise less than 40% of either of the at least one of the axial tows or the braid tows.

A further embodiment of the present disclosure provides a method of improving material characteristics of braided carbon materials. Heat and pressure are applied to a braided carbon structure comprising tows having less than 40% thermoplastic filaments to reduce the per-ply thickness of the braided carbon structure and form a braided carbon preform.

A yet further embodiment of the present disclosure provides a method of improving material characteristics of braided carbon materials. A braided carbon preform is infused with a thermoset resin. The thermoset resin is cured within the braided carbon preform such that heat applied during infusing and curing melts softens a thermoplastic material within the braided carbon preform to toughen the resulting braided composite product.

A further embodiment of the present disclosure provides a method of forming a braided composite product. Carbon filaments and thermoplastic filaments are braided together to form a braided carbon structure. At least one of heat or pressure is applied to the braided carbon structure to form a braided carbon preform. A toughened braided composite product is formed from the braided carbon preform.

Another embodiment of the present disclosure provides a triaxial braided carbon structure. The triaxial braided carbon structure comprises axial tows, each axial tow formed of a respective thermoplastic filament with a cross-sectional dimension not exceeding 2 mm; and braid tows at a braid angle relative to the axial tows, the braid tows comprising carbon filaments and/or carbon and thermoplastic filaments with the thermoplastic filaments comprising less than 40% of either of at least one of the axial tows or the braid tows.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
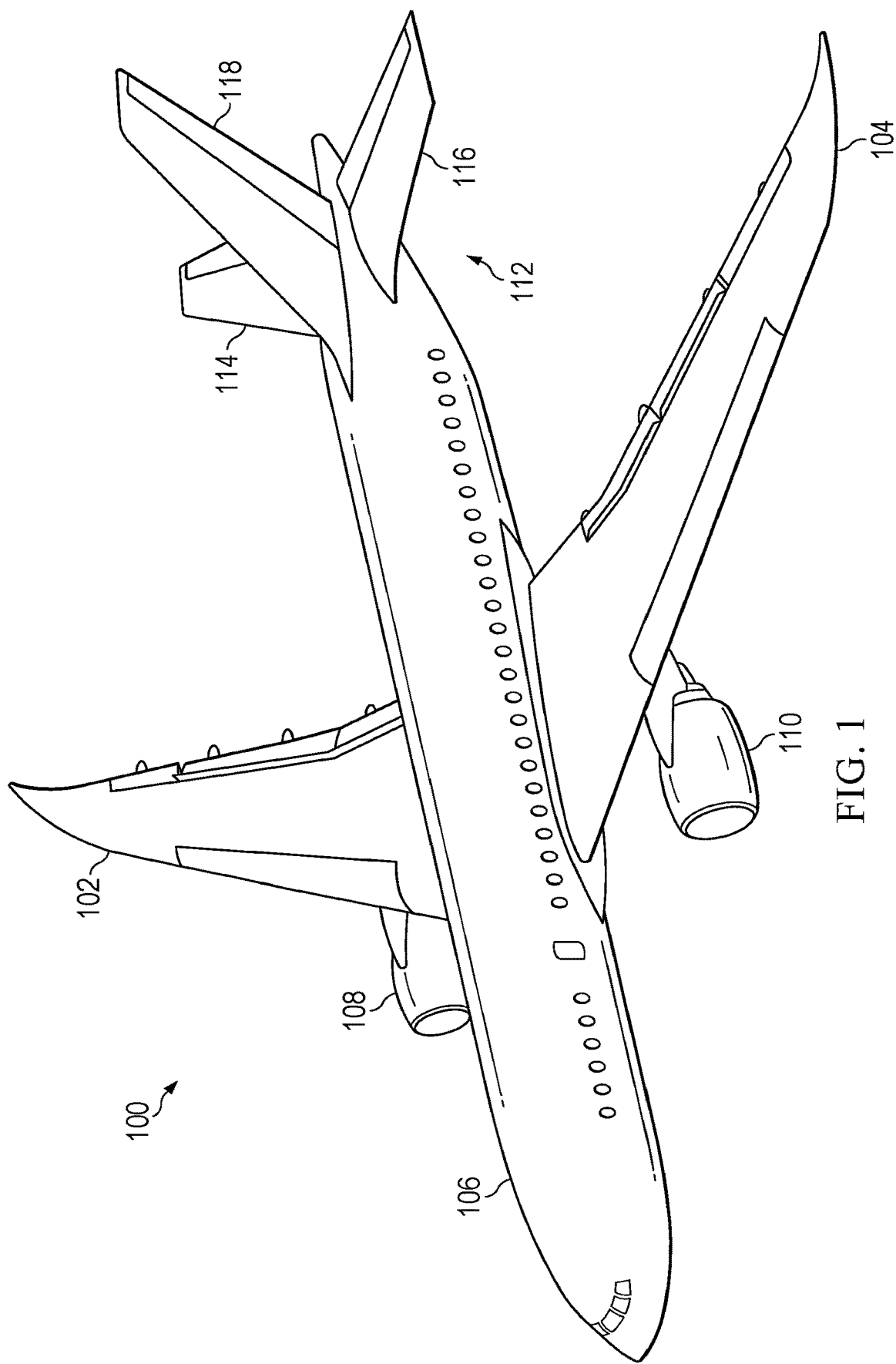
FIG. 1 is an illustration of an aircraft in accordance with an illustrative embodiment.

The illustrative examples recognize and take into account one or more different considerations. The illustrative examples recognize and take into account that some approaches have been developed to try to improve through-thickness mechanical properties of composite materials.

For example, some composite structures use resins toughened with particles made from rubber, polyetherimide, polyethersulfone, or other types of particles. The illustrative examples recognize and take into account that composites made from toughened resins can have a low glass transition temperature, low mechanical properties in hot and wet conditions, and can be less resistant to solvents. The illustrative examples recognize and take into account that toughened resins can be too viscous for use in the resin infusion process.

The illustrative examples recognize and take into account that electro-spinning soluble thermoplastic fibers onto the reinforcement can be performed before making prepregs. The illustrative examples recognize and take into account that electro-spinning is an extra process step which requires time, equipment and factory space.

The illustrative examples recognize and take into account that some conventional methods insert thin solid thermoplastic films. The solid films are impermeable and can interfere with resin infusion.

The illustrative examples recognize and take into account that non-woven fibrous thermoplastic veils can be place between plies technical textiles to improve through-thickness mechanical properties of the composite. The veils may tear if the plies are not handled with care, resulting in poor material properties where the tears occur. Placing the veils over a large area on technical textiles is also an extra process step requiring time, equipment and factory space, and can be time consuming.

The illustrative examples recognize and take into account that stitching and Z-pinning can also be used to improve the through-thickness properties of the composites but these methods generally lead to reductions in the in-plane mechanical properties. Z-pinning is also an extra process step requiring time, equipment, and factory space.

Except for toughened resins, stitching, and Z-pinning, all the above solutions improve the through-thickness properties of the composite by toughening the resin rich layer between carbon plies (inter-layer toughening).

The illustrative examples recognize and take into account that braided composites generally have lower in-plane mechanical properties compared to tape and woven fabric composites because the aspect ratio (width/height ratio) of the tows in a braided composite are low in comparison to a tape or woven fabric composite i.e. the tows tend to be rounder in shape. In addition, the resin-rich areas within a braided composite are generally larger. Another factor contributing to the lower mechanical properties in braided composites is tow damage from the braiding process. The illustrative examples recognize and take into account that to improve in-plane mechanical properties, asymmetrical braids can be created. However, the braids need to be flipped during layup or setup in a manufacturing line with two braiding machines.

The illustrative examples recognize and take into account that technical textiles are typically stabilized along their edges only. The illustrative examples recognize and take into account that the angles between the tows are prone to change during handling and layup. The illustrative examples recognize and take into account that a small change in tow angle can lead to significant changes in the in-plane mechanical properties of composites.

The illustrative examples recognize and take into account that handling the technical textiles with extreme care to avoid changes in tow angle slows down the layup process. The illustrative examples recognize and take into account that taping the edges of the textile manually after they are cut to the desired shape can be performed. The illustrative examples recognize and take into account that taping the edges is time consuming and requires the use of additional consumable materials.

The illustrative examples recognize and take into account that tacking plies together can be performed to maintain orientation of the tows. However, the illustrative examples recognize and take into account that tacking plies together is time consuming.

The illustrative examples recognize and take into account that a braiding process allows broad goods, sleeves, and overbraids with complex cross-sectional shapes to be produced directly from tows through automation. The illustrative examples recognize and take into account that hand-layup of plies, which is time consuming, can be eliminated for some components by use of braiding. The illustrative examples recognize and take into account that the angles of the braids can be aligned with the loading direction of the structure by adjusting the process parameters. The illustrative examples recognize and take into account that controlling the angles of the braids can allow the production of structures that are optimized to carry load along the primary loading direction. The illustrative examples recognize and take into account that the weight of structures can be reduced due to structural loading by using braiding. The illustrative examples recognize and take into account that less material is used for making the same parts using braiding. Example structures that can be made using braiding are aircraft frames, spars, ribs, rocket nozzles, engine propellers, and aircraft cabin window frames.

The illustrative examples provide toughening both within (intra-layer) and between plies. The illustrative examples present a braided composite structure that comprises at least one of thermoplastic filaments, co-mingled carbon-thermoplastic tows, or carbon-only tows and a thermoset resin. The braid, which can come in the form of a sleeve, broad good and/or overbraid can have a bi-axial or tri-axial configuration. The braided composite structure is formed by braiding together at least one of theromplastic filaments, co-mingled carbon-thermoplastic tows, and carbon-only tows. After braiding, the braided carbon structure is preformed to partially melt and/or soften the thermoplastic filaments, flattening the tows of the braided carbon structure. After preforming, the braided carbon preform is infused with a thermoset resin and the thermoset resin is cured.

Turning now to FIG. 1, an illustration of an aircraft is depicted in accordance with an illustrative embodiment.

Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components formed of braided composite products comprising thermoplastic material. For example, components in passenger cabin within body 106 can be formed of braided composite products comprising thermoplastic material. In one illustrative example, cabin window frames within body 106 of aircraft 100 can be formed of braided composite products comprising thermoplastic material.

Figure 2:
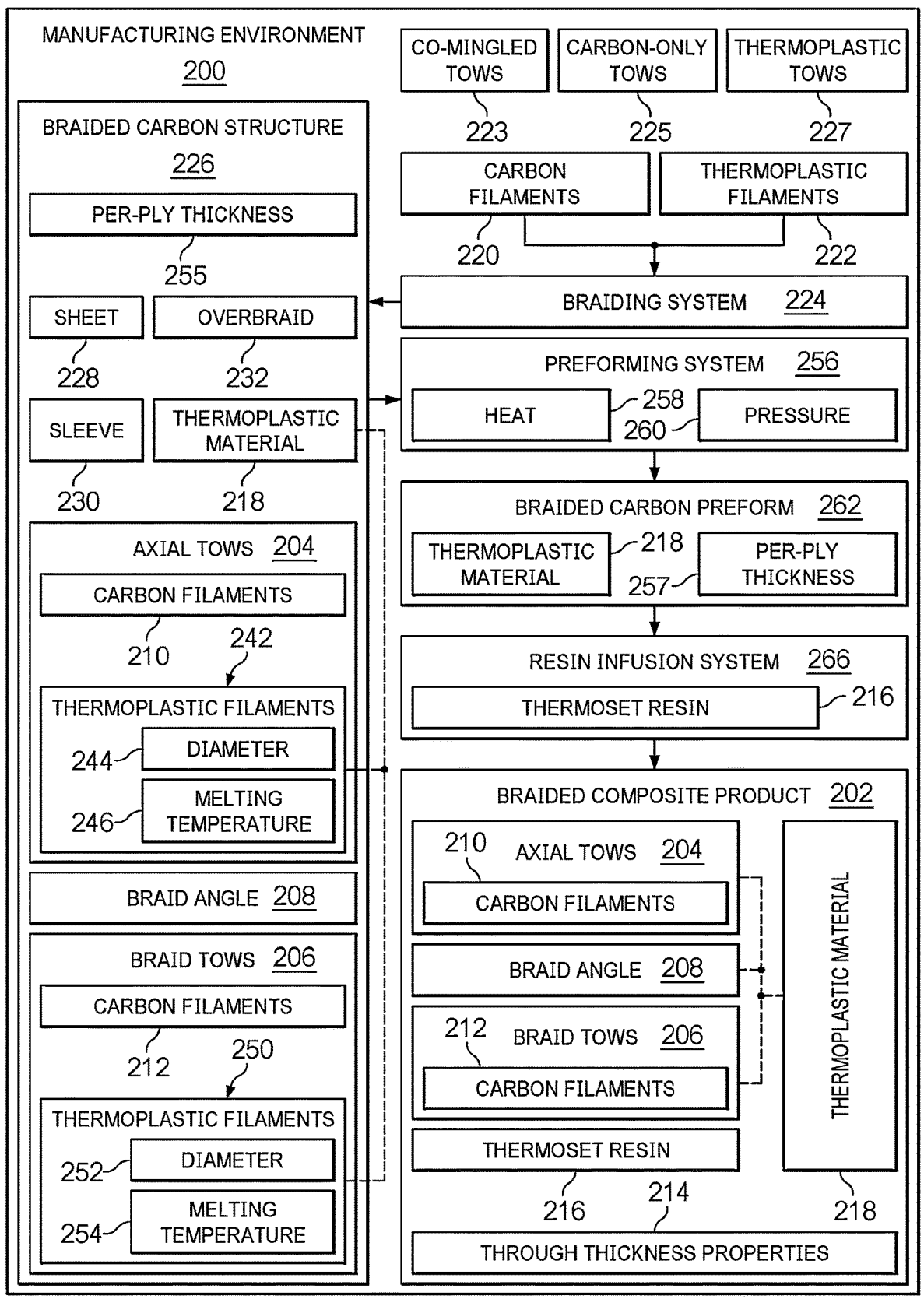
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Components of aircraft 100 of FIG. 1 can be manufactured in manufacturing environment 200. Braided composite product 202 can be formed in manufacturing environment 200.

Braided composite product 202 comprises axial tows 204 and braid tows 206 at braid angle 208 relative to axial tows 204. In some illustrative examples, braid angle 208 is independent of sign for the angle of braid tows 206 relative to axial tows 204. For example, braid angle 208 can include both positive and negative angles having the same value relative to axial tows 204. For example, braid angle 208 could include both −20 degrees and 20 degrees relative to axial tows 204. In these illustrative examples, braided composite product 202 is a triaxial braided composite product. In some illustrative examples, axial tows 204 comprise carbon filaments 210. Braid tows 206 comprise carbon filaments 212. Braided composite product 202 has improved through-thickness properties 214 over conventional braided composites as a result of intra-layer toughening from thermoplastic material 218. Braided composite product 202 further comprises thermoset resin 216 infused through axial tows 204 and braid tows 206.

To form braided composite product 202, carbon filaments 220 and thermoplastic filaments 222 are braided using braiding system 224. Braiding system 224 can perform braiding over a constant or varying cross-sectional shape. Thermoplastic filaments 222 can be made from any desirable thermoplastic, such as Nylon 6, Nylon 12, polyamides, polystyrenes, polyethylenes, polyesters, or other desirable thermoplastic materials.

Thermoplastic filaments 222 can be made from one or any combination of desirable thermoplastic materials. In some illustrative examples, thermoplastic filaments 222 comprise more than one type of thermoplastic filament. In some illustrative examples, thermoplastic filaments 222 can have a cross-sectional shape that can be round, elliptical or flat. Prior to braiding, thermoplastic filaments 222 are selected and positioned into braiding system 224 according to a desired composition of braided composite product 202. Prior to braiding, thermoplastic filaments 222 and carbon filaments 220 are selectively formed into tows. Prior to braiding, carbon filaments 220 and thermoplastic filaments 222 are formed into at least one of co-mingled tows 223, carbon-only tows 225, or thermoplastic tows 227.

In some illustrative examples, thermoplastic filaments 222 are co-mingled with carbon filaments 220 to form co-mingled tows 223. In these illustrative examples, co-mingled tows 223 are loaded into braiding system 224. In some illustrative examples, thermoplastic filaments 222 have cross-sectional measurements of 200 microns or less. In co-mingled tows 223, thermoplastic filaments 222 can be distributed randomly or regularly amongst carbon filaments 220 or be positioned around the periphery of carbon filaments 220. In co-mingled tows 223, thermoplastic filaments 222 constitute less than 40% of the volume of the respective co-mingled yarn. In some illustrative examples, co-mingled tows 223, thermoplastic filaments 222 constitute less than 20% of the volume of the respective co-mingled yarn. In some illustrative examples, co-mingled tows 223, thermoplastic filaments 222 constitute 10% or less of the volume of the respective co-mingled yarn. In some illustrative examples, carbon filaments 220 are provided without any thermoplastic material in carbon-only tows 225. In these illustrative examples, carbon-only tows 225 are provided to braiding system 224.

In some illustrative examples, thermoplastic filaments 222 are provided in thermoplastic tows 227. Each thermoplastic tow of thermoplastic tows 227 only contains one thermoplastic filament of thermoplastic filaments 222. Thermoplastic filaments 222 in thermoplastic tows 227 can have a cross-sectional dimension of up to 2 mm.

Braiding together carbon filaments 220 and thermoplastic filaments 222 forms braided carbon structure 226. In some illustrative examples, braided carbon structure 226 takes the form of at least one of sheet 228, sleeve 230, or overbraid 232.

Braided carbon structure 226 comprises axial tows 204, braid tows 206, and thermoplastic material 218. In some illustrative examples, axial tows 204 comprise carbon filaments 210. Braid tows 206 are at braid angle 208 relative to axial tows 204. Braid tows 206 comprise carbon filaments 212. Thermoplastic material 218 is within at least one of axial tows 204 or braid tows 206. In some illustrative examples, thermoplastic material 218 makes up less than 40% of each of the at least one of axial tows 204 or braid tows 206. In some illustrative examples, thermoplastic material 218 makes up less than 25% of each of the at least one of axial tows 204 or braid tows 206. In some illustrative examples, thermoplastic material 218 makes up 10% or less by volume of each of the at least one of axial tows 204 or braid tows 206. Thermoplastic material 218 is present in a sufficient amount in the braided carbon structure 226 to enable intra-layer and inter-layer toughening. Thermoplastic material 218 is present in a sufficient amount in braided carbon structure 226 to stabilize axial tows 204 and braid tows 206 relative to each other for handling. Thermoplastic material 218 is not present in a sufficient amount in braided carbon structure 226 to act as a matrix for a braided composite product 202 comprising axial tows 204 and braid tows 206.

In some illustrative examples, axial tows 204 comprise thermoplastic filaments 242. Thermoplastic filaments 242 have melting temperature 246.

In some illustrative examples, in braided carbon structure 226, thermoplastic material 218 comprises thermoplastic filaments 222 co-mingled with carbon filaments 220. In these illustrative examples, thermoplastic filaments 222 have a cross-section dimension of 200 microns or less. In these illustrative examples, axial tows 204 take the form of co-mingled tows 223.

In some illustrative examples, axial tows 204 do not comprise thermoplastic filaments 242. In these illustrative examples, axial tows 204 take the form of carbon-only tows 225.

In some other illustrative examples, axial tows 204 do not have carbon filaments 220. When carbon filaments 220 are not present in axial tows 204, thermoplastic filaments 242 have diameter 244 of up to 2 mm. In these illustrative examples, each axial tow of axial tows 204 is formed of a respective thermoplastic filament with a cross-sectional dimension not exceeding 2 mm.

In some illustrative examples, braid tows 206 comprise thermoplastic filaments 250. In these illustrative examples, thermoplastic filaments 250 have diameter 252 of 200 microns or less. Thermoplastic filaments 250 have melting temperature 254. In these illustrative examples, braid tows 206 take the form of co-mingled tows 223.

In some illustrative examples, braid tows 206 do not comprise thermoplastic filaments 250. In these illustrative examples, braid tows 206 take the form of carbon-only tows 225.

In some illustrative examples, braided carbon structure 226 comprises axial tows 204 having thermoplastic filaments 242 and braid tows 206 that do not contain thermoplastic material 218. In these illustrative examples, axial tows 204 take the form of one of thermoplastic tows 227 or co-mingled tows 223 and braid tows 206 take the form of carbon-only tows 225.

In some illustrative examples, braided carbon structure 226 comprises braid tows 206 having thermoplastic filaments 250 and axial tows 204 that do not contain thermoplastic material 218. In these illustrative examples, braid tows 206 are co-mingled tows 223 and axial tows 204 are carbon-only tows 225. In some illustrative examples, braided carbon structure 226 comprises axial tows 204 having thermoplastic filaments 242 and braid tows 206 comprising thermoplastic filaments 250. In these illustrative examples, axial tows 204 take the form of one of thermoplastic tows 227 or co-mingled tows 223 and braid tows 206 take the form of co-mingled tows 223.

In some illustrative examples, thermoplastic filaments 242 are present in each tow of axial tows 204. In some illustrative examples, thermoplastic filaments 242 are present in a subset of axial tows 204. In this illustrative example, a subset is one or more items of a group.

In some illustrative examples, thermoplastic filaments 250 are present in each tow of braid tows 206. In some illustrative examples, thermoplastic filaments 250 are present in a subset of braid tows 206.

In some illustrative examples, thermoplastic filaments 222 are randomly distributed within at least one of axial tows 204 or braid tows 206. In some illustrative examples, thermoplastic filaments 242 are randomly distributed within axial tows 204. By being randomly distributed, thermoplastic filaments 242 are not organized within a respective tow of axial tows 204. In some illustrative examples, thermoplastic filaments 250 are randomly distributed within braid tows 206. By being randomly distributed, thermoplastic filaments 250 are not organized within a respective tow of braid tows 206.

In some illustrative examples, thermoplastic filaments 222 are distributed in a regular pattern amongst carbon filaments 220 within at least one of axial tows 204 or braid tows 206. In some illustrative examples, thermoplastic filaments 242 are distributed in a regular pattern within axial tows 204. By being distributed in a regular pattern, thermoplastic filaments 242 are organized within a respective tow of axial tows 204 containing thermoplastic filaments 242. In some illustrative examples, thermoplastic filaments 250 are distributed in a regular pattern within braid tows 206. By being distributed in a regular pattern, thermoplastic filaments 250 are organized within a respective tow of braid tows 206.

In some illustrative examples, thermoplastic filaments 222 are distributed around a periphery of at least one of axial tows 204 or braid tows 206. In some illustrative examples, thermoplastic filaments 242 are distributed around a periphery of axial tows 204. By being distributed around a periphery, thermoplastic filaments 242 are around a periphery of a respective tow of axial tows 204 containing thermoplastic filaments 242. In some illustrative examples, thermoplastic filaments 250 are distributed around a periphery of braid tows 206. By being distributed around a periphery, thermoplastic filaments 250 are around a periphery of a respective tow of braid tows 206 containing thermoplastic filaments 250.

Any desirable combination of thermoplastic filaments 222 and carbon filaments 220 is contained in braided carbon structure 226. In some illustrative examples, at least one of random distribution, regular pattern distribution, or distribution around a periphery of thermoplastic filaments 242 is present in one or more tows of axial tows 204. In some illustrative examples, a mixture of distributions of thermoplastic filaments 242 are present in axial tows 204. In some illustrative examples, at least one of random distribution, regular pattern distribution, or distribution around a periphery of thermoplastic filaments 250 is present in one or more tows of braid tows 206. In some illustrative examples, a mixture of distributions of thermoplastic filaments 250 are present in braid tows 206.

After braiding carbon filaments 220 and thermoplastic filaments 222 to form braided carbon structure 226, braided carbon structure 226 is sent to preforming system 256. In preforming system, at least one of heat 258 or pressure 260 is applied to braided carbon structure 226 to form braided carbon preform 262. Braided carbon preform 262 comprises axial tows 204 and braid tows 206 of braided carbon structure 226, but thermoplastic filaments 222 are at least partially melted or softened to form thermoplastic material 218. In these illustrative examples, whichever of thermoplastic filaments 242 or thermoplastic filaments 250 that are present in braided carbon structure 226 are compacted by preforming in preforming system 256.

The level of vacuum or applied pressure 260, duration and temperature of the heating step by providing heat 258 can be controlled and varied during preforming to adjust the per-ply thickness of braided carbon preform 262.

In some illustrative examples, the preforming further comprises subsequently heating/preforming braided carbon structure 226 to within 10° C. of a melting temperature of thermoplastic filaments 222 under controlled atmospheric pressure to soften or melt thermoplastic filaments 222. When thermoplastic filaments 222 at least partially melt, thermoplastic filaments 222 will mix with thermoset resin 216. When thermoplastic filaments 222 soften, thermoplastic filaments 222 will remain as a distinctive phase from thermoset resin 216. In some illustrative examples, the preforming comprises heating/preforming braided carbon structure 226 to within 10° C. of melting temperature 246 of thermoplastic filaments 242 under controlled atmospheric pressure to soften or melt thermoplastic filaments 242. In some illustrative examples, the preforming comprises heating/preforming braided carbon structure 226 to within 10° C. of melting temperature 254 of thermoplastic filaments 250 under controlled atmospheric pressure to soften or melt thermoplastic filaments 250. In some illustrative examples, thermoplastic filaments 242 and thermoplastic filaments 250 are both present in braided carbon structure 226 and are the same material. In some other illustrative examples, thermoplastic filaments 242 and thermoplastic filaments 250 are both present in braided carbon structure 226 and are different thermoplastic materials such that melting temperature 246 and melting temperature 254 are different.

Thermoplastic material 218 at least partially coats carbon filaments 220, such as carbon filaments 210 and carbon filaments 212 during preforming. At least partially coating carbon filaments 210 and carbon filaments 212 during preforming stabilizes braided carbon preform 262 for ease of handling and enhances the fracture toughness of the co-mingled composite, braided composite product 202, by inter-layer and intra-layer toughening. Preforming also flattens the tows, which will improve the in-plane mechanical properties.

Applying at least one of heat 258 or pressure 260 to braided carbon structure 226 forms braided carbon preform 262 that comprises axial tows 204 and braid tows 206 with thermoplastic material 218 that is thermoplastic filaments 222 that have been softened during preforming. In some illustrative examples, applying at least one of heat 258 or pressure 260 to braided carbon structure 226 forms braided carbon preform 262 that comprises axial tows 204 and braid tows 206 with thermoplastic material 218 that is thermoplastic filaments 222 that have been at least partially melted during preforming. Braided carbon preform 262 comprises thermoplastic material 218 softened or at least partially melted from thermoplastic filaments 222 by the at least one of heat 258 or pressure 260.

After preforming, braided carbon preform 262 has per-ply thickness 257. Per-ply thickness 257 is smaller than per-ply thickness 255 of braided carbon structure 226. Per-ply thickness 257 is less than per-ply thickness 255 due to flattening of the tows, axial tows 204 and braid tows 206, of braided carbon structure 226 during preforming.

After preforming, braided carbon preform 262 is infused with thermoset resin 216 by resin infusion system 266. By infusing thermoset resin 216 into braided carbon preform 262, braided composite product 202 comprises co-mingled thermoplastic material 218 and thermoset resin 216. Thermoplastic material 218 acts as a toughening agent and bring about inter-layer and intra-layer toughening in a resin infused composite structure, braided composite product 202. Thermoplastic filaments 222 braided into braided carbon structure 226 improve through-thickness mechanical properties of braided composite product 202 over conventional low through-thickness mechanical properties.

The preforming and resin-infusing steps provide advantages over conventional composite processing. During preforming, carbon filaments 220 are at least partially coated by the softened or partially melted thermoplastic material 218, which hold them together and stabilize the braid during handling or layup. Braided carbon preform 262 is stabilized by thermoplastic material 218 rather than only being stabilized along its edges. Applying at least one of heat 258 or pressure 260 by preforming system 256 stabilizes braided carbon preform 262 such that braid angle 238 is not undesirably affected by handling braided carbon preform 262.

During preforming, the carbon tows are flattened using at least one of heat 258 or pressure 260. Flattening axial tows 204 and braid tows 206 is beneficial to the in-plane mechanical properties of resulting braided composite product 202.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, preforming system 256 can include at least one of a mandrel, vacuum bagging materials, heating blankets, or any other desirable type of tooling and equipment.

As another example, although axial tows 204 are discussed, axial tows 204 can be optional. When braid tows 206 at positive and negative values of braid angle 208 are present within braided carbon structure 226, axial tows 204 and braid tows 206 form a triaxial braid. When axial tows 204 are not present in braided carbon structure 226, braid tows 206 are present at positive and negative values of braid angle 208 relative to an axis of braiding system 224. When only braid tows 206 are present, braid tows 206 form a biaxial braid. In these illustrative examples, braid tows 206 can be described as a first set of tows and a second set of tows at an angle relative to each other. In these illustrative examples, the first set of tows comprises braid tows 206 at a positive braid angle 208 while the second set of tows comprises braid tows 206 at a negative braid angle 208. In these illustrative examples, at least one of the first set of tows or the second set of tows comprises thermoplastic filaments 250. In this illustrative example, thermoplastic material 218 is present within at least one of the first set of tows or the second set of tows, wherein thermoplastic material 218 makes up less than 40% by volume of each of the at least one of the first set of tows or the second set of tows.

Figure 3:
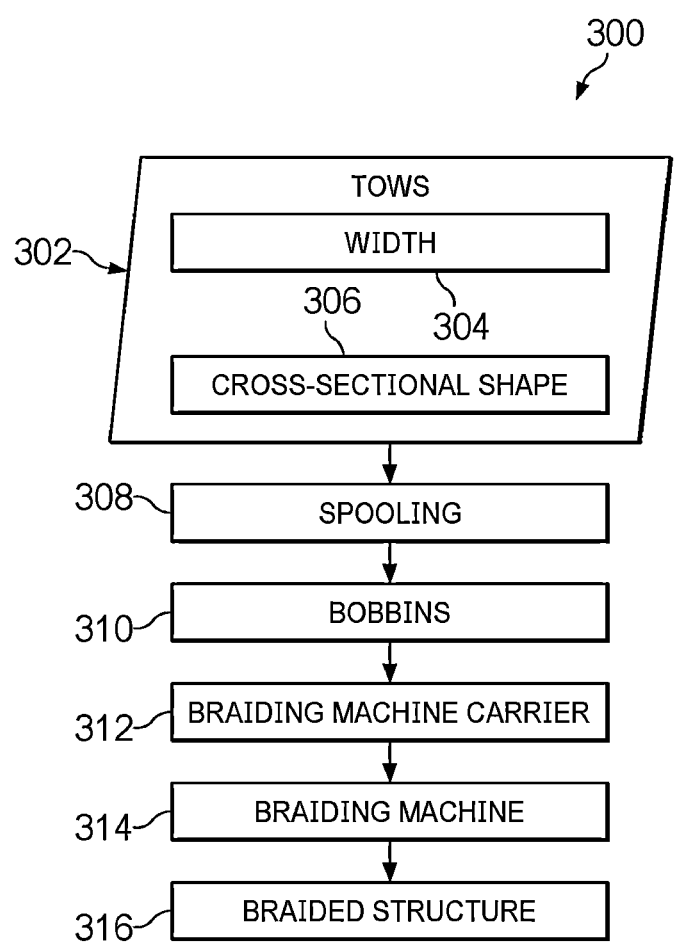
FIG. 3 is an illustration of a block diagram of flowchart of using tows in a braided material in accordance with an illustrative embodiment.

Turning now to FIG. 3, an illustration of a block diagram of flowchart of using tows in a braided material is depicted in accordance with an illustrative embodiment. Flowchart 300 shows tows 302 going through a manufacturing process. Tows 302 can be used to form a component of aircraft 100 of FIG. 1. Tows 302 are formed of at least one of carbon filaments 220 or thermoplastic filaments 222 of FIG. 2.

Tows 302 each have its own respective width, width 304, and cross-sectional shape 306. As tows 302 undergo processing, width 304 and cross-sectional shape 306 are affected by the processing. In spooling 308, tows 302 are placed on to material holding spools. Tows 302 substantially maintain their original width, width 304, and cross-sectional shape 306 during spooling 308. After spooling 308, tows 302 are transferred to bobbins 310 to be placed in braiding machine carriers. The tows 302 are then sent over braiding machine carriers 312 and through the rest of braiding machine 314 so that tows 302 are interlaced to form the braided structure 316.

As tows 302 move through flowchart 300, width 304 and cross-sectional shape 306 change. For example, as tows 302 move through braiding machine carriers 312 and braiding machine 314 to form the braided structure 316, width 304 decreases and cross-sectional shape 306 becomes thicker. When cross-sectional shape 306 of tows 302 becomes thicker, a resulting braided carbon composite is thicker. After resin infusion, resin-pocket regions in the composite product become larger when the braided carbon composite is thicker. Resin-pocket regions undesirably affect the in-plane mechanical properties of the composite. By reducing the thickness of tows 302 following braiding by braiding machine 314, mechanical characteristics of braided structure 316 containing tows 302 are improved.

In this illustrative example, braided structure 316 can be an example of braided carbon structure 226 of FIG. 2. Braided structure 316 can undergo preforming and resin infusion as in FIG. 2. When braided structure 316 undergoes preforming, cross-sectional shape 306 of tows 302 is compressed.

Figure 4B:
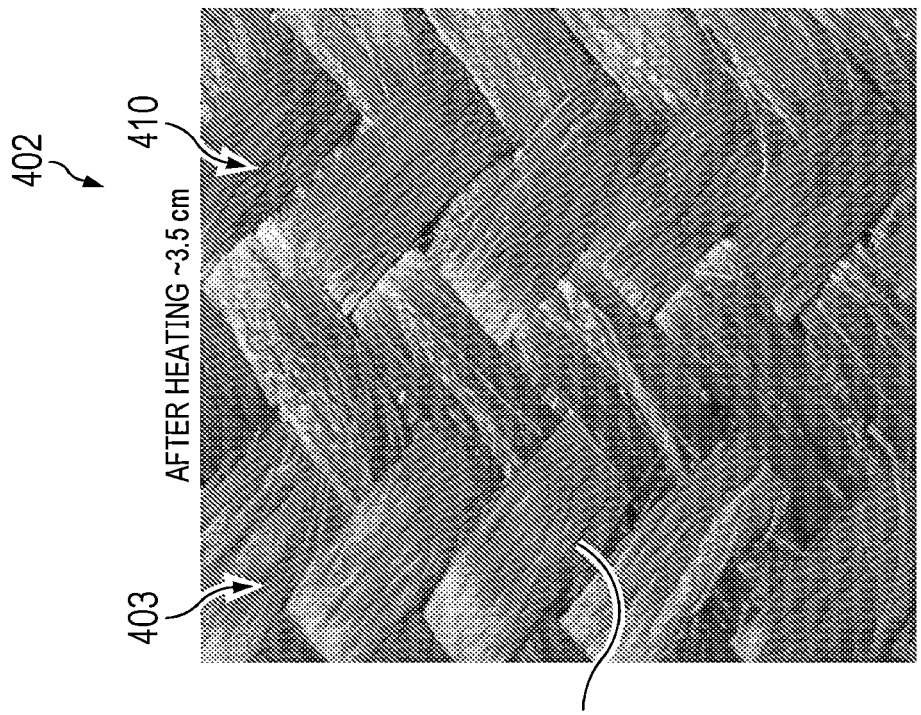
FIGS. 4A and 4B are illustrations of braided carbon tows with thermoplastic filaments before and after heating and pressure in accordance with an illustrative embodiment.
Figure 4A:
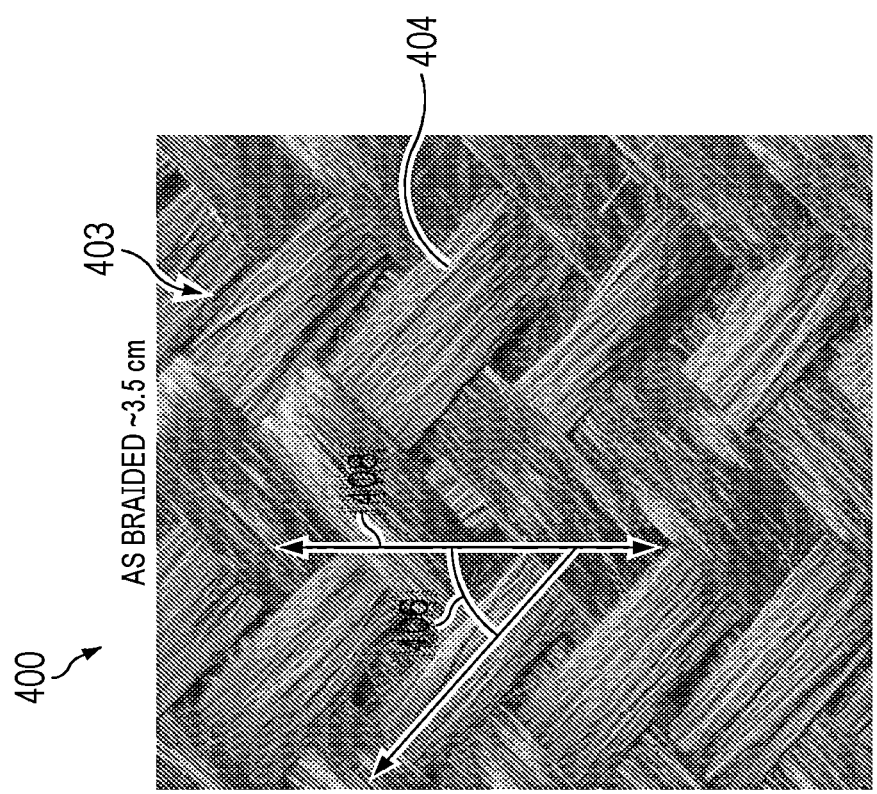

Turning now to FIGS. 4A and 4B, illustrations of braided carbon tows with thermoplastic filaments before and after heating and pressure are depicted in accordance with an illustrative embodiment. Image 400 and image 402 can be images of a braided carbon structure that can be used to form a component of aircraft 100 of FIG. 1. Image 400 and image 402 can be of braided carbon structure 226 and braided carbon preform 262 of FIG. 2. Image 400 and image 402 can be of tows 302 of FIG. 3.

Image 400 is an image of braided carbon structure 403 with braid tows 404 at braid angle 406 with axial tow direction 408. In this illustrative example, braided carbon structure 403 is a triaxial braid. In image 400, the axial tows are not visible. Braided carbon structure 403 comprises thermoplastic filaments in at least one of braid tows 404 or the axial tows (not visible). In image 400, braided carbon structure 403 has an undesirable per-ply thickness. In image 400, braided carbon structure 403 is untacked and braid tows 404 are able to move relative to the axial tows (not visible).

In image 402, braided carbon structure 403 has at least one of heat or pressure applied to form braided carbon preform 410. The level of vacuum or applied pressure, duration and temperature of the heating step can be controlled and varied during this step to adjust the per-ply thickness of the braid. In this illustrative examples, braided carbon preform 410 is stabilized 412. By applying at least one of heat or pressure to braided carbon structure 403, the per-ply thickness of braided carbon structure 403 has been reduced between image 400 and image 402. Further, braid tows 404 have been stabilized 412 to axial tows (not visible) to reduce or eliminate movement of braid tows 404 relative to axial tows (not visible). By applying at least one of heat or pressure to braided carbon structure 403, braided carbon preform 410 is a triaxial braid with a reduced per-ply thickness. Although braided carbon structure 403 is a triaxial braid, in some illustrative examples, axial tows (not visible) are not present. In these illustrative examples, the braided carbon structure is a biaxial braid.

Figure 5:
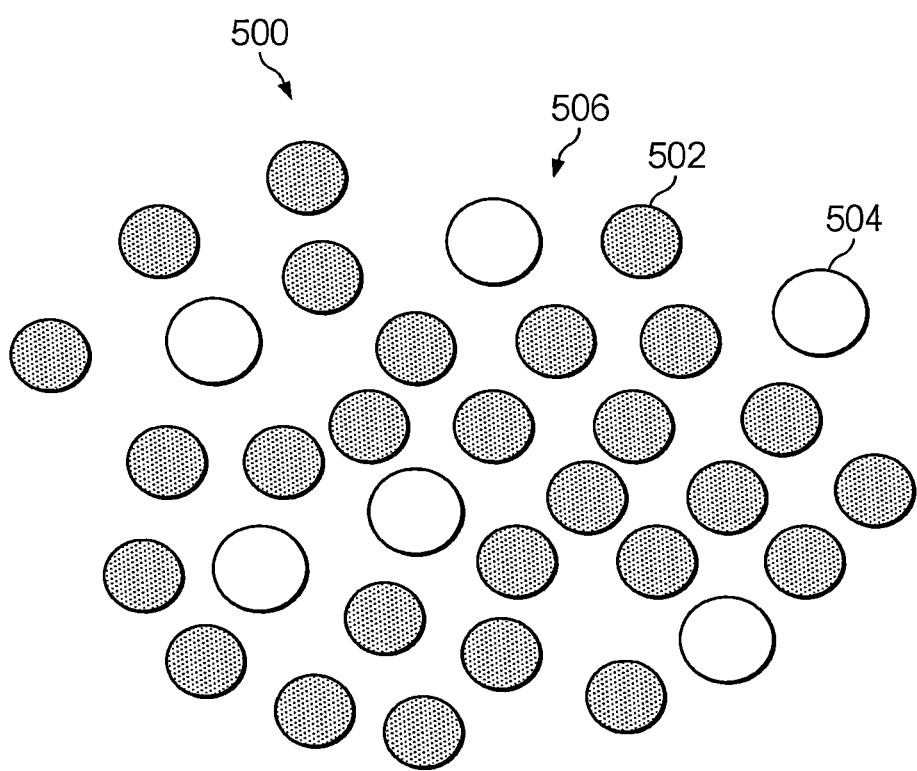
FIG. 5 is an illustration of a cross-sectional view of a tow with carbon filaments and thermoplastic filaments in accordance with an illustrative embodiment.

Turning now to FIG. 5, an illustration of a cross-sectional view of a tow with carbon filaments and thermoplastic filaments is depicted in accordance with an illustrative embodiment. Tow 500 can be used to form a component of aircraft 100 of FIG. 1. Tow 500 can be formed of carbon filaments 220 and thermoplastic filaments 222 of FIG. 2. Tow 500 can be one of axial tows 204 or braid tows 206 of braided carbon structure 226. Tow 500 can be one of tows 302 of FIG. 3. In some illustrative examples, image 400 and image 402 of FIGS. 4A and 4B could be images of tow 500.

Tow 500 is an example of a co-mingled tow of co-mingled tows 223 of FIG. 2. Tow 500 comprises carbon filaments 502 and thermoplastic filaments 504. Tow 500 is provided only for illustrative purposes of a distribution type for thermoplastic filaments 504. The depicted ratio of carbon filaments 502 and thermoplastic filaments 504 in the illustration is not limiting. In some illustrative examples, thermoplastic filaments 504 is present in a sufficient amount to stabilize axial tows and braid tows relative to each other for handling. In some illustrative examples, thermoplastic filaments 504 is present in a sufficient amount to increase the fracture toughness of the resulting braided composite product by intra-layer toughening. Thermoplastic filaments 504 are not present in a sufficient amount to act as a matrix for a thermoplastic composite product comprising the axial tows and braid tows. In the illustrative examples of tows to be used in braided carbon structures or braided carbon preforms, thermoplastic filaments 504 will be less than 40% of the tow. In some of the illustrative examples of tows to be used in braided carbon structures or braided carbon preforms, thermoplastic filaments 504 will be less than 20% of the tow by volume. In some of the illustrative examples of tows to be used in braided carbon structures or braided carbon preforms, thermoplastic filaments 504 will be 10% or less of the tow.

Tow 500 is an example of randomly dispersed pattern 506 of thermoplastic filaments 504. As depicted, thermoplastic filaments 504 are randomly dispersed with carbon filaments 502 in tow 500.

Figure 6:
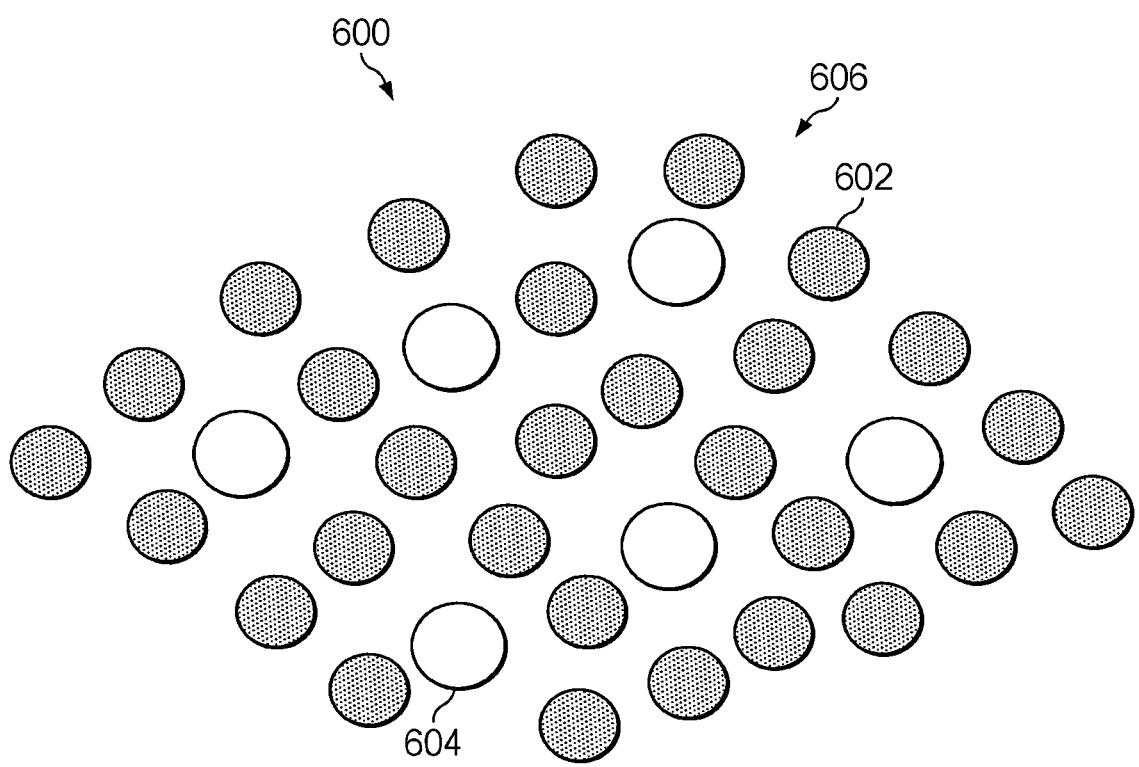
FIG. 6 is an illustration of a cross-sectional view of a tow with carbon filaments and thermoplastic filaments in accordance with an illustrative embodiment.

Turning now to FIG. 6, an illustration of a cross-sectional view of a tow with carbon filaments and thermoplastic filaments is depicted in accordance with an illustrative embodiment. Tow 600 can be used to form a component of aircraft 100 of FIG. 1. Tow 600 can be formed of carbon filaments 220 and thermoplastic filaments 222 of FIG. 2. Tow 600 can be one of axial tows 204 or braid tows 206 of braided carbon structure 226. Tow 600 can be one of tows 302 of FIG. 3. In some illustrative examples, image 400 and image 402 of FIGS. 4A and 4B could be images of tow 600.

Tow 600 comprises carbon filaments 602 and thermoplastic filaments 604. Tow 600 is provided only for illustrative purposes of a distribution type for thermoplastic filaments 604. The ratio of carbon filaments 602 and thermoplastic filaments 604 is not limiting.

In some illustrative examples, thermoplastic filaments 604 is present in a sufficient amount to stabilize axial tows and braid tows relative to each other for handling. In some illustrative examples, thermoplastic filaments 604 is present in a sufficient amount to increase the fracture toughness of the resulting braided composite product by intra-layer toughening. Thermoplastic filaments 604 are not present in a sufficient amount to act as a matrix for a thermoplastic composite product comprising the axial tows and braid tows. In the illustrative examples of tows to be used in braided carbon structures or braided carbon preforms, thermoplastic filaments 604 will be less than 40% of the tow. In some of the illustrative examples of tows to be used in braided carbon structures or braided carbon preforms, thermoplastic filaments 604 will be less than 20% of the tow by volume. In some of the illustrative examples of tows to be used in braided carbon structures or braided carbon preforms, thermoplastic filaments 604 will be 10% or less of the tow.

Tow 600 is an example of a co-mingled tow of co-mingled tows 223 of FIG. 2. Tow 600 is an example of regularly dispersed pattern 606 of thermoplastic filaments 604. As depicted, thermoplastic filaments 604 are interspersed with carbon filaments 602 in a regular pattern.

Figure 7:
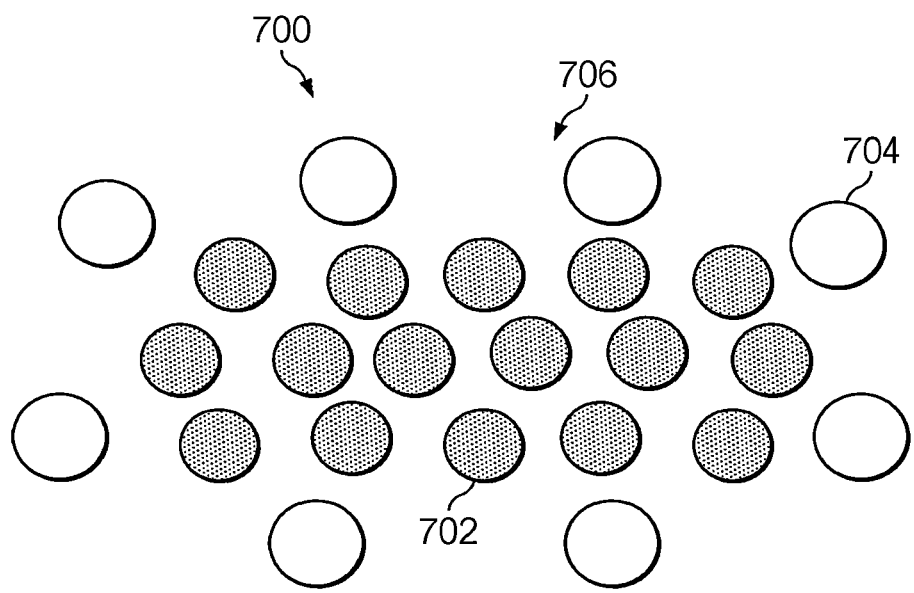
FIG. 7 is an illustration of a cross-sectional view of a tow with carbon filaments and thermoplastic filaments in accordance with an illustrative embodiment.

Turning now to FIG. 7, an illustration of a cross-sectional view of a tow with carbon filaments and thermoplastic filaments is depicted in accordance with an illustrative embodiment. Tow 700 can be used to form a component of aircraft 100 of FIG. 1. Tow 700 can be formed of carbon filaments 220 and thermoplastic filaments 222 of FIG. 2. Tow 700 can be one of axial tows 204 or braid tows 206 of braided carbon structure 226. Tow 700 can be one of tows 302 of FIG. 3. In some illustrative examples, image 400 and image 402 of FIGS. 4A and 4B could be images of tow 700.

Tow 700 is an example of a co-mingled tow of co-mingled tows 223 of FIG. 2. Tow 700 comprises carbon filaments 702 and thermoplastic filaments 704. Tow 700 is provided only for illustrative purposes of a distribution type for thermoplastic filaments 704. The ratio of carbon filaments 702 and thermoplastic filaments 704 is not limiting. In some illustrative examples, thermoplastic filaments 704 is present in a sufficient amount to stabilize axial tows and braid tows relative to each other for handling. In some illustrative examples, thermoplastic filaments 704 is present in a sufficient amount to increase the fracture toughness of the resulting braided composite product by intra-layer toughening. Thermoplastic filaments 704 are not present in a sufficient amount to act as a matrix for a thermoplastic composite product comprising the axial tows and braid tows. In the illustrative examples of tows to be used in braided carbon structures or braided carbon preforms, thermoplastic filaments 704 will be less than 40% of the tow. In some of the illustrative examples of tows to be used in braided carbon structures or braided carbon preforms, thermoplastic filaments 704 will be less than 20% of the tow. In some of the illustrative examples of tows to be used in braided carbon structures or braided carbon preforms, thermoplastic filaments 704 will be 10% or less of the tow. Tow 700 is an example of peripherally dispersed pattern 706 of thermoplastic filaments 704.

Figure 8:
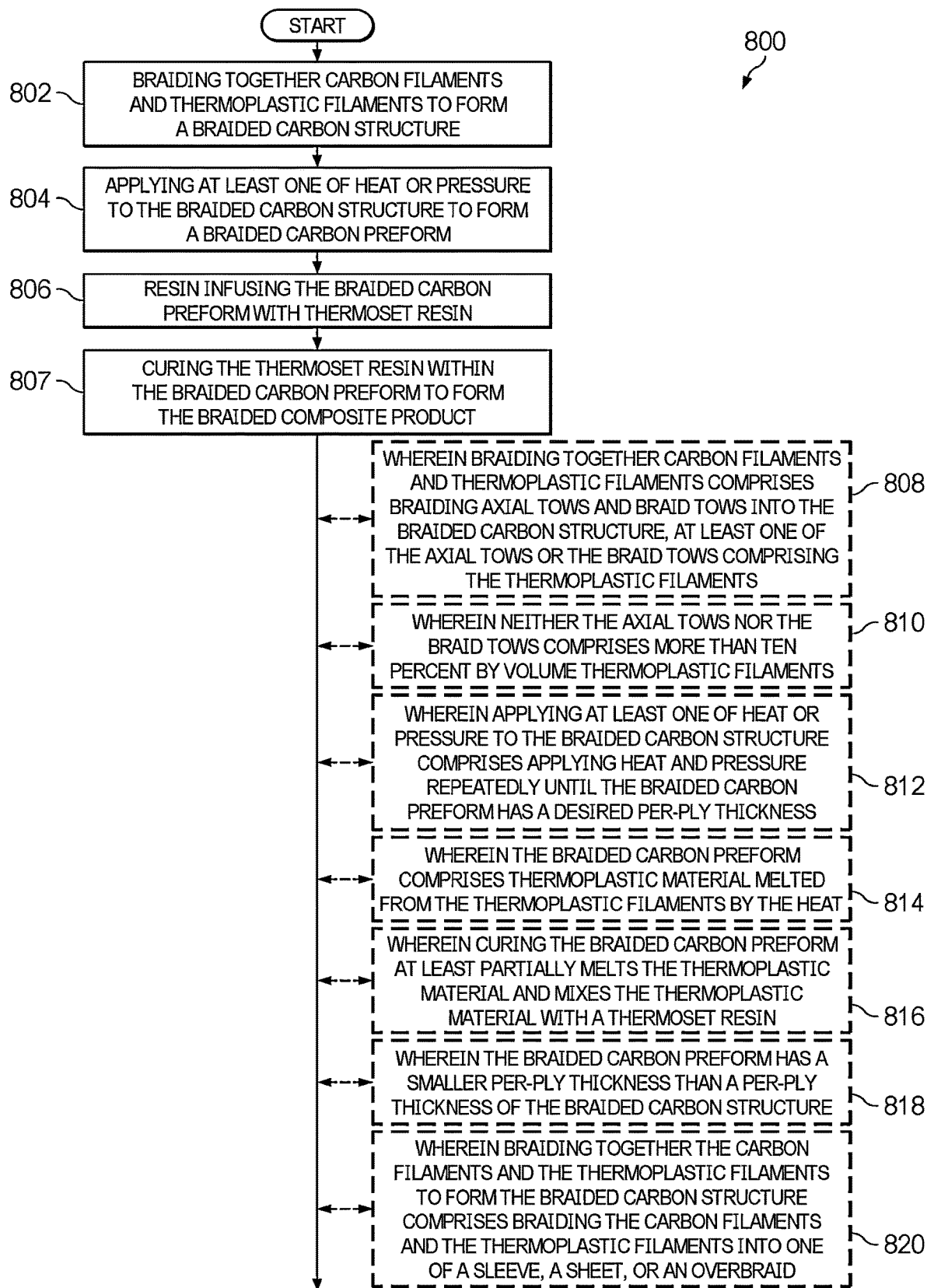
FIG. 8 is a flowchart of a method of forming a braided composite product in accordance with an illustrative embodiment.

Turning now to FIG. 8, a flowchart of a method of forming a braided composite product is depicted in accordance with an illustrative embodiment. Method 800 can be used to form a component of aircraft 100 of FIG. 1. Method 800 can be used to form braided composite product 202 of FIG. 2. Method 800 can use tows 302 of FIG. 3. Image 400 and image 402 of FIGS. 4A and 4B can be examples of a braided carbon structure formed by method 800. Tow 500 of FIG. 5, tow 600 of FIG. 6, and tow 700 of FIG. 7 are examples of a tow that can be used in method 800.

Method 800 braids together carbon filaments and thermoplastic filaments to form a braided carbon structure (operation 802). The carbon filaments and thermoplastic filaments form axial tows and braid tows of the braided carbon structure. In some illustrative examples, both the axial tows and the braid tows comprise carbon filaments. In some illustrative examples, only the braid tows comprise carbon filaments. In some illustrative examples, at least one of the axial tows or the braid tows comprise the thermoplastic filaments.

Method 800 applies at least one of heat or pressure to the braided carbon structure to form a braided carbon preform (operation 804). In some illustrative examples, applying at least one of heat or pressure to the braided carbon structure stabilizes the preform by partially melting the thermoplastic filaments to lock the braid together to facilitate movement or handling of the preform. The level of vacuum or applied pressure, duration and temperature of the heating step can be controlled and varied during this step to adjust the per-ply thickness of the braid. Method 800 resin infuses the braided carbon preform with thermoset resin (operation 806). Method 800 cures the thermoset resin within the braided carbon preform to form the braided composite product (operation 807). Afterwards, method 800 terminates.

In some illustrative examples, braiding together carbon filaments and thermoplastic filaments comprises braiding axial tows and braid tows into the braided carbon structure, at least one of the axial tows or the braid tows comprising the thermoplastic filaments (operation 808). In some illustrative examples, neither the axial tows nor the braid tows comprises more than 40% by volume of thermoplastic filaments. In some illustrative examples, neither the axial tows nor the braid tows comprises more than 20% by volume of thermoplastic filaments. In some illustrative examples, neither the axial tows nor the braid tows comprises more than 10% by volume of thermoplastic filaments (operation 810).

In some illustrative examples, applying at least one of heat or pressure to the braided carbon structure comprises applying heat and pressure repeatedly until the braided carbon preform has a desired per-ply thickness (operation 812). In some illustrative examples, the braided carbon preform comprises thermoplastic material melted from the thermoplastic filaments by the heat (operation 814). In some illustrative examples, curing the braided carbon preform at least partially melts the thermoplastic material and mixes the thermoplastic material with a thermoset resin (operation 816).

In some illustrative examples, the braided carbon preform has a smaller per-ply thickness than a per-ply thickness of the braided carbon structure (operation 818). In some illustrative examples, applying at least one of heat or pressure to the braided carbon structure reduces the thickness of the braided carbon structure. In some illustrative examples, applying at least one of heat or pressure to the braided carbon structure at least partially melts the thermoplastic filaments to stabilize the braided carbon preform. By stabilizing the braided carbon preform, the smaller through ply thickness of the braided carbon preform formed by the pressure can be maintained by the stabilizing of the thermoplastic material.

In some illustrative examples, braiding together the carbon filaments and the thermoplastic filaments to form the braided carbon structure comprises braiding the carbon filaments and the thermoplastic filaments into one of a sleeve, a sheet, or an overbraid (operation 820).

Figure 9:
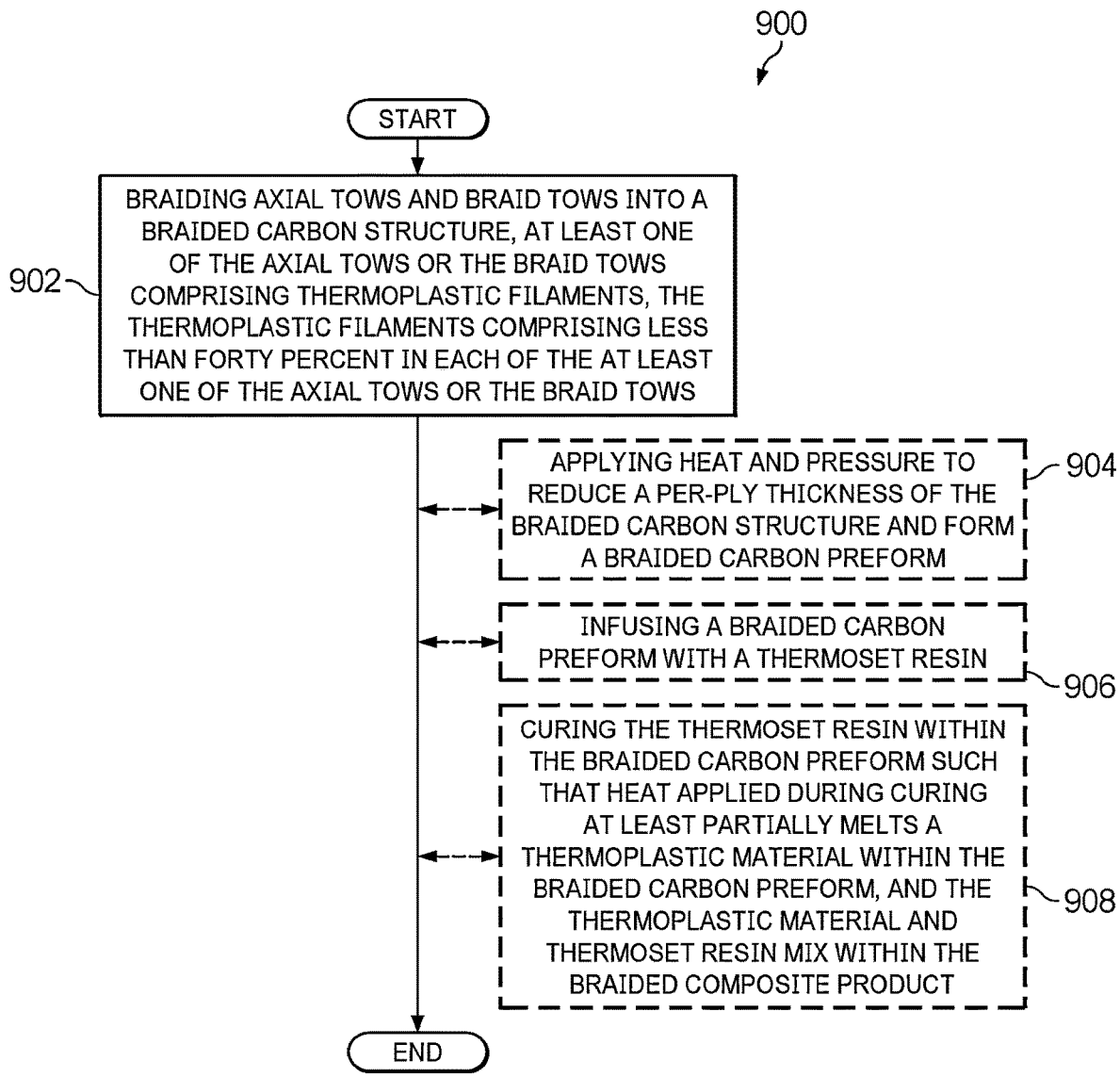
FIG. 9 is a flowchart of a method of forming a braided composite product in accordance with an illustrative embodiment.

Turning now to FIG. 9, a flowchart of a method of forming a braided composite product is depicted in accordance with an illustrative embodiment. Method 900 can be used to form a component of aircraft 100 of FIG. 1. Method 900 can form braided carbon structure 226 of FIG. 2. Method 900 can use tows 302 of FIG. 3. Image 400 and image 402 of FIGS. 4A and 4B can be examples of a braided carbon structure formed by method 900. Tow 500 of FIG. 5, tow 600 of FIG. 6, and tow 700 of FIG. 7 are examples of a tow that can be used in method 900.

Method 900 forms a braided composite product. Method 900 braids axial tows and braid tows into a braided carbon structure, at least one of the axial tows or the braid tows comprising thermoplastic filaments, the thermoplastic filaments comprising less than 40% in each of the at least one of the axial tows or the braid tows (operation 902). Afterwards, method 900 terminates. In some illustrative examples, the thermoplastic filaments comprise less than 20% by volume in each of the at least one of the axial tows or the braid tows. In some illustrative examples, the thermoplastic filaments comprise 10% or less by volume in each of the at least one of the axial tows or the braid tows.

In some illustrative examples, method 900 further comprises applying heat and pressure to reduce a per-ply thickness of the braided carbon structure and form a braided carbon preform (operation 904). In some illustrative examples, method 900 further comprises infusing the braided carbon preform with a thermoset resin (operation 906). In some illustrative examples, method 900 further comprises curing the thermoset resin within the braided carbon preform such that heat applied during curing at least partially melts a thermoplastic material within the braided carbon preform, and the thermoplastic material and thermoset resin mix within the braided composite product (operation 908).

Figure 10:
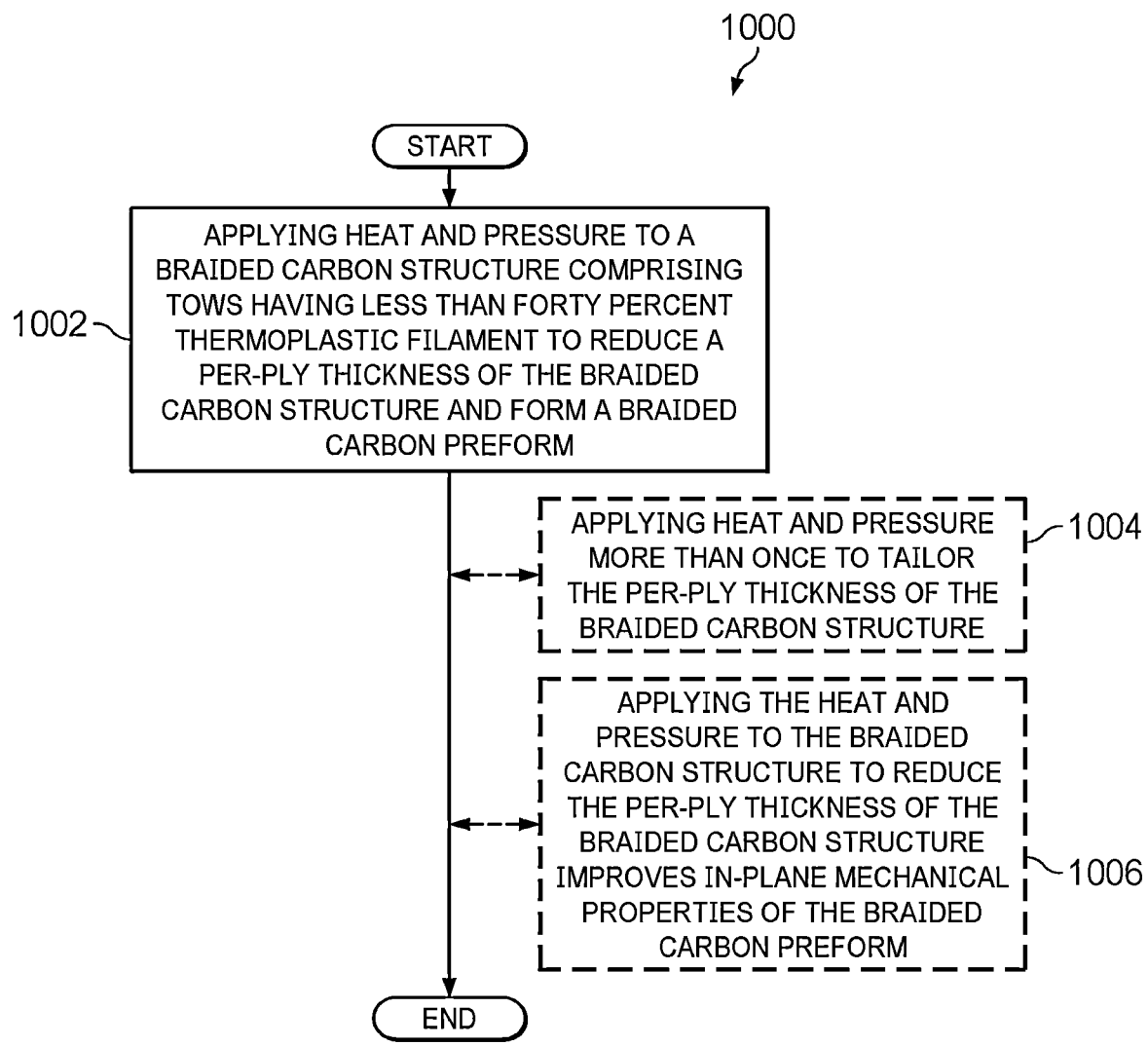
FIG. 10 is a flowchart of a method of improving material characteristics of braided carbon materials in accordance with an illustrative embodiment.

Turning now to FIG. 10, a flowchart of a method of improving material characteristics of braided carbon materials is depicted in accordance with an illustrative embodiment. Method 1000 can be used to form a component of aircraft 100 of FIG. 1. Method 1000 can be performed on braided carbon structure 226 of FIG. 2. Method 1000 can use tows 302 of FIG. 3. Image 400 and image 402 of FIGS. 4A and 4B can be examples of a braided carbon structure formed by method 1000. Tow 500 of FIG. 5, tow 600 of FIG. 6, and tow 700 of FIG. 7 are examples of a tow that can be used in method 1000.

Method 1000 improves material characteristics of braided carbon materials. Method 1000 applies heat and pressure to a braided carbon structure comprising tows having less than 40% thermoplastic filament to reduce a per-ply thickness of the braided carbon structure and form a braided carbon preform (operation 1002). Afterwards, method 1000 terminates. In some illustrative examples, the thermoplastic filaments comprise less than 20% by volume in each of the at least one of the axial tows or the braid tows. In some illustrative examples, the thermoplastic filaments comprise 10% or less by volume in each of the at least one of the axial tows or the braid tows.

In some illustrative examples, method 1000 applies the heat and pressure more than once to tailor the per-ply thickness of the braided carbon structure (operation 1004). In some illustrative examples, the heat and pressure are adjusted for each preforming step to tailor the per-ply thickness of the braiding carbon structure. In some illustrative examples, applying the heat and pressure to the braided carbon structure to reduce the per-ply thickness of the braided carbon structure improves in-plane mechanical properties of the braided carbon preform (operation 1006).

Figure 11:
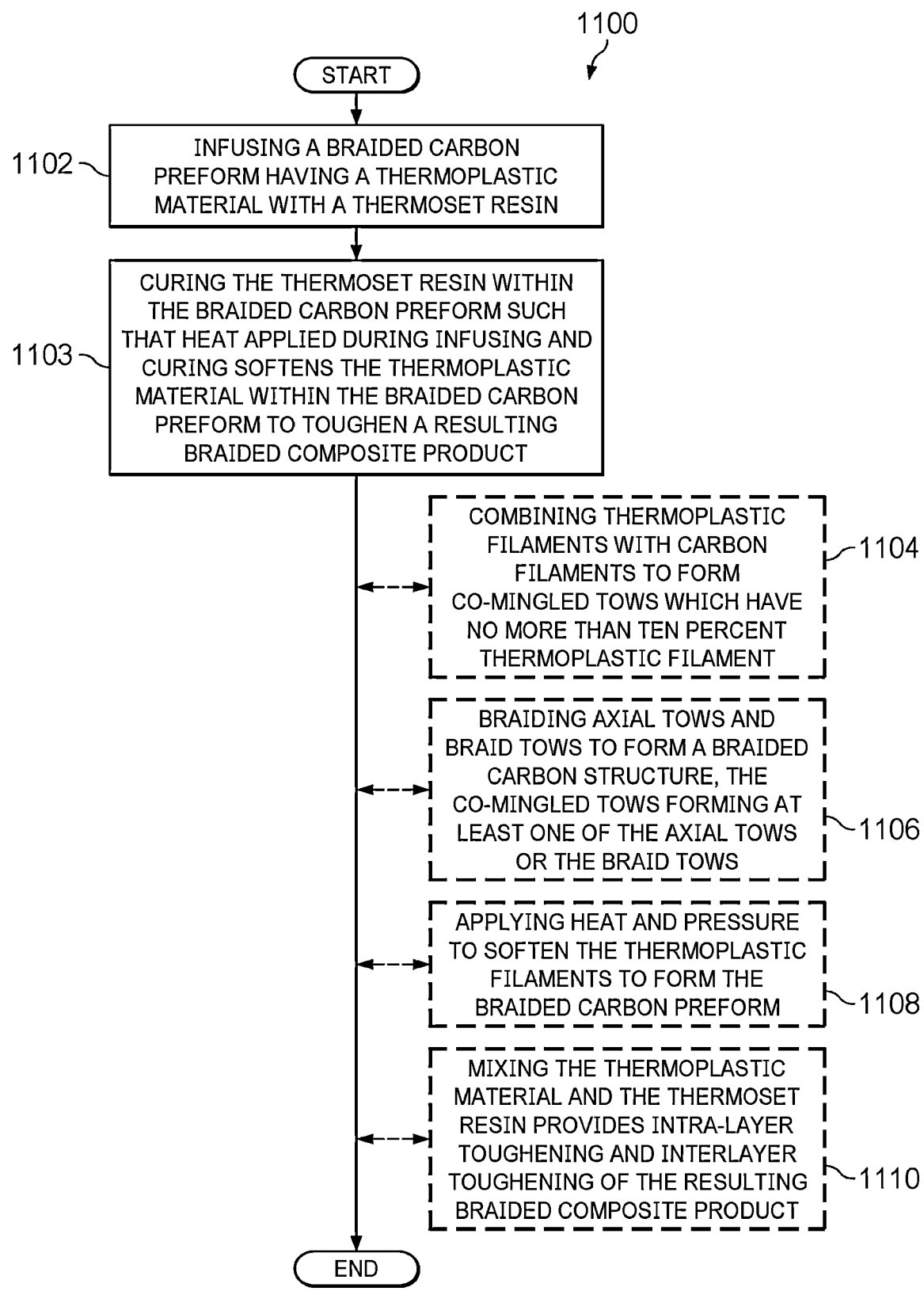
FIG. 11 is a flowchart of a method of improving material characteristics of braided carbon materials in accordance with an illustrative embodiment.

Turning now to FIG. 11, a flowchart of a method of improving material characteristics of braided carbon materials is depicted in accordance with an illustrative embodiment. Method 1100 can be used to form a component of aircraft 100 of FIG. 1. Method 1100 can infuse braided carbon preform 262 of FIG. 2. Method 1100 can use tows 302 of FIG. 3. Image 400 and image 402 of FIGS. 4A and 4B can be examples of a braided carbon preform to be infused by method 1100. Tow 500 of FIG. 5, tow 600 of FIG. 6, and tow 700 of FIG. 7 are examples of a tow that can be used in method 1100.

Method 1100 infuses a braided carbon preform having a thermoplastic material with a thermoset resin (operation 1102). Method 1100 cures the thermoset resin within the braided carbon preform such that heat applied during infusing and curing softens the thermoplastic material within the braided carbon preform to toughen a resulting braided composite product (operation 1103). Afterwards, method 1100 terminates.

In some illustrative examples, method 1100 further comprises combining thermoplastic filaments with carbon filament to form co-mingled tows which have no more than 10% thermoplastic filament (operation 1104).

In some illustrative examples, method 1100 further comprises braiding axial tows and braid tows to form a braided carbon structure, the co-mingled tows forming at least one of the axial tows or the braid tows (operation 1106). In some illustrative examples, method 1100 further comprises applying heat and pressure to soften the thermoplastic filaments to form the braided carbon preform (operation 1108). In some illustrative examples, mixing the thermoplastic material and the thermoset resin provides intra-layer toughening and interlayer toughening of the resulting braided composite product (operation 1110).

Figure 12:
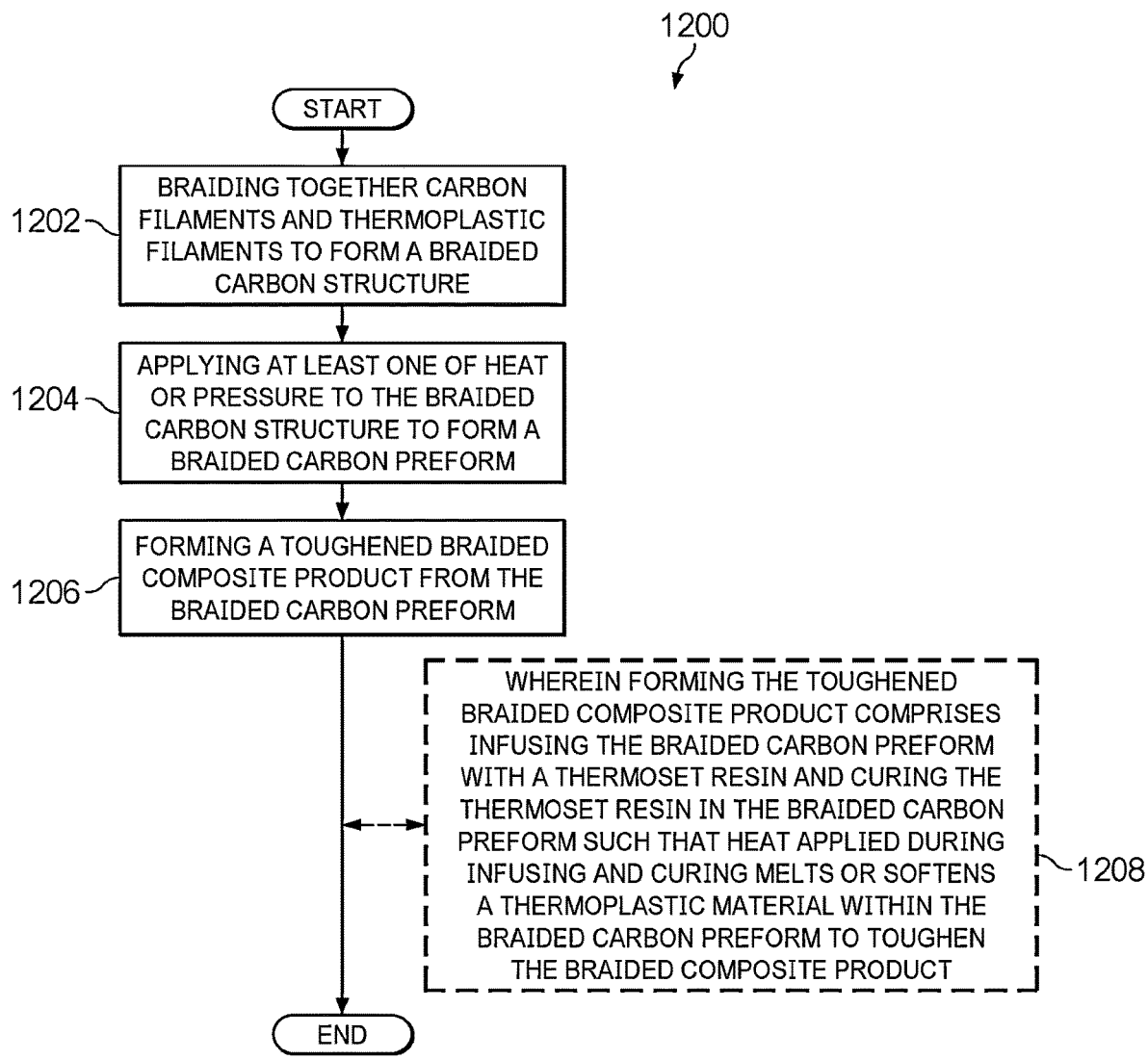
FIG. 12 is a flowchart of a method of forming a braided composite product in accordance with an illustrative embodiment.

Turning now to FIG. 12, a flowchart of a method of forming a braided composite product is depicted in accordance with an illustrative embodiment. Method 1200 can be used to form a component of aircraft 100 of FIG. 1. Method 1200 can infuse braided carbon preform 262 of FIG. 2. Method 1200 can use tows 302 of FIG. 3. Image 400 and image 402 of FIGS. 4A and 4B can be examples of a braided carbon preform to be infused by method 1200. Tow 500 of FIG. 5, tow 600 of FIG. 6, and tow 700 of FIG. 7 are examples of a tow that can be used in method 1200.

Method 1200 braids together carbon filaments and thermoplastic filaments to form a braided carbon structure (operation 1202). Method 1200 applies at least one of heat or pressure to the braided carbon structure to form a braided carbon preform (operation 1204). Method 1200 forms a toughened braided composite product from the braided carbon preform (operation 1206). Afterwards, method 1200 terminates.

In some illustrative examples, forming the toughened braided composite product comprises infusing the braided carbon preform with a thermoset resin and curing the thermoset resin in the braided carbon preform such that heat applied during infusing and curing melts or softens a thermoplastic material within the braided carbon preform to toughen the braided composite product (operation 1208). Mixing the thermoplastic material and the thermoset resin provides intra-layer toughening and interlayer toughening of the resulting braided composite product.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 808 through operation 820 may be optional. For example, operation 904 through operation 908 may be optional. For example, operation 1004 and 1006 may be optional. For example, operation 1104 through operation 1110 may be optional. As another example, operation 1208 of FIG. 12 may be optional.

Figure 13:
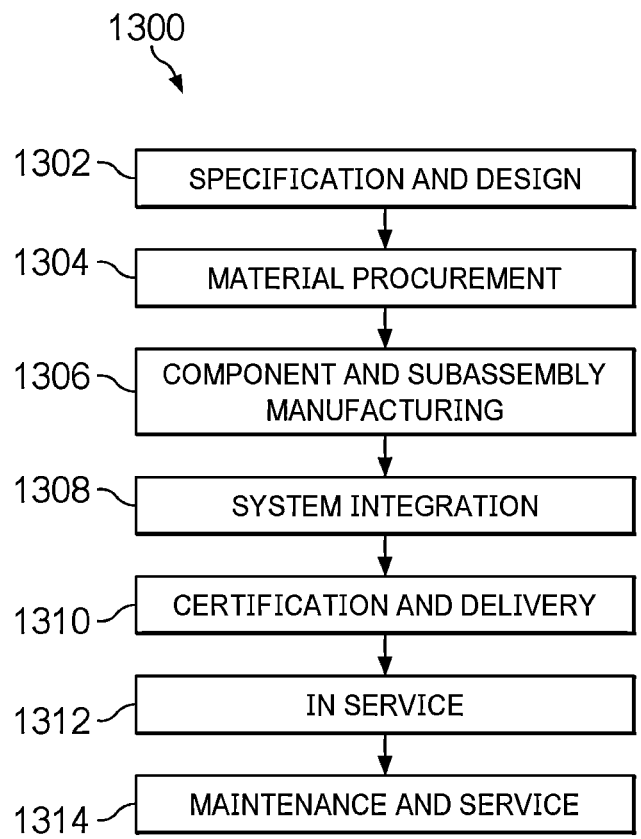
FIG. 13 is an illustration of an aircraft manufacturing and service method in a form of a block diagram in accordance with an illustrative embodiment.
Figure 14:
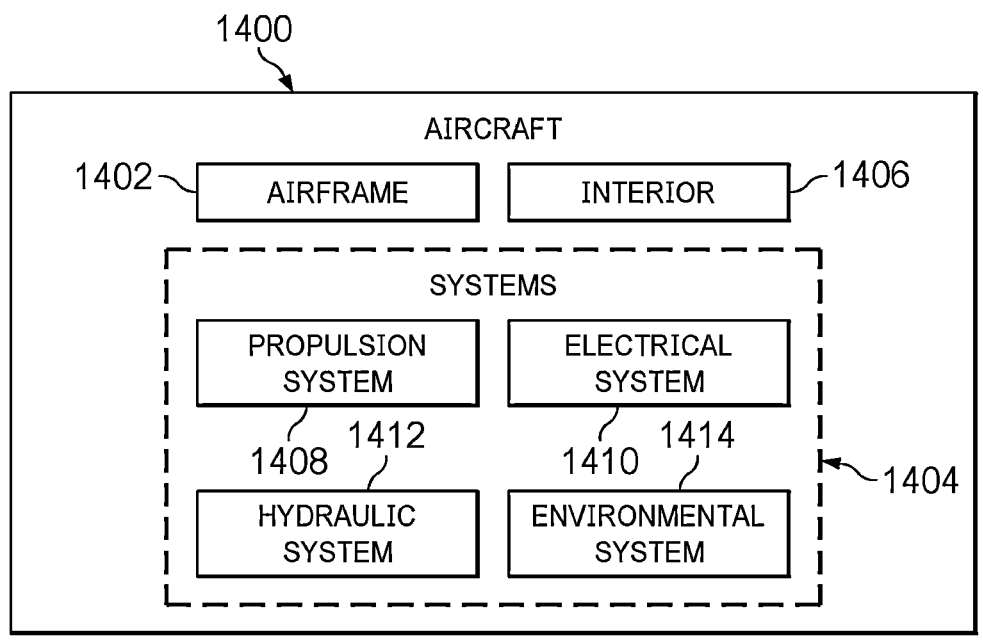
FIG. 14 is an illustration of an aircraft in a form of a block diagram in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method in a form of a block diagram is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft in a form of a block diagram is depicted in which an illustrative embodiment may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included.

Apparatuses and methods embodied herein may be employed during at least one of the stages of aircraft manufacturing and service method 1300. One or more illustrative embodiments may be manufactured or used during at least one of component and subassembly manufacturing 1306, system integration 1308, in service 1312, or maintenance and service 1314 of FIG. 13.

A portion of airframe 1402 of aircraft 1400 can be formed by one of method 800, method 900, method 1000, method 1100, or method 1200. At least one of method 800, method 900, method 1000, method 1100, or method 1200 can be performed during component and subassembly manufacturing 1306. A composite structure formed using one of method 800, method 900, method 1000, method 1100, or method 1200 can be present and utilized during in service 1312. At least one of method 800, method 900, method 1000, or method 1100 can be performed during maintenance and service 1314 to form a replacement part.

The illustrative examples, fabricate a braided carbon fiber preform with co-mingled thermoplastic filaments for resin infusion. The co-mingled thermoplastic filaments make up less than 40% by volume of the braided carbon fiber preform. The thermoplastic filaments are present in a sufficient amount in the braided carbon preform to stabilize axial tows and braid tows relative to each other for handling. The thermoplastic filaments are not present in a sufficient amount in the braided carbon preform to act as a matrix for a thermoplastic composite product comprising the axial tows and braid tows. In some illustrative examples, the thermoplastic filaments make up no more than 10% by volume of the braided carbon fiber preform.

The filaments are then heated as part of the preform consolidation process to the point of softening or partially melting. The partially melted filaments help to tack the preform into the consolidated flattened configuration. In some illustrative examples, the partially melted filaments help to tack the preform into the consolidated flattened configuration with all tows in plane. The preform is then resin infused with the resin. In some illustrative examples, the resin and the melted thermoplastic filaments mix to increase the fracture toughness of the resulting resin infused composite.

The illustrative examples enable a braided structure with flatter tows than is possible with prior methods. The angles between the tows are prone to change during handling and layup. A small change in tow angle can lead to significant reductions in the in-plane mechanical properties of composites. The current invention targets toughening both intra-layer and between plies.

The illustrative examples present a method of producing carbon-thermoplastic braided composites by braiding together: (a) carbon tows and (b) co-mingled tows consisting of continuous carbon and a small percentage of tiny thermoplastic filaments ($\leq 10\%$ of by volume, $\leq 200$ microns in any cross-sectional dimension) and/or (c) thin thermoplastic filaments ($\leq 2$ mm in any cross-sectional dimension) to produce co-mingled braided broad-goods, sleeves or over-braids.

The illustrative examples introduce the addition of an atmospheric controlled heating/preforming step after braiding. In some illustrative examples, the heating step occurs under vacuum or applied pressure. In some illustrative examples, the temperature of the heating step is within 10° C. of the melting point of the thermoplastic, and can be varied during this step. Level of vacuum or applied pressure during this step, and its duration can be varied. Adjusting the temperature, vacuum/pressure level, and duration of the heating step allows the per-ply thickness and ratio of the length/width of the tows in the textiles to be controlled by the preforming step. High length/width ratios are known to be beneficial to the in-plane mechanical properties of composites.

The carbon filaments are partially coated by the softened and melted thermoplastic, which hold them together and stabilize the braid during handling or layup. This improves issues with handling braided composite materials.

The carbon tows are flattened during the heating/preforming step, and this is beneficial to the in-plane mechanical properties of the composite. This improves the in-plane mechanical properties for braided composite.

The thermoplastic filaments act as toughening agents and bring about inter-layer and intra-layer toughening in a resin infused composite structure. Conventional work in the area of improving the through-thickness properties of composites primarily target improving the toughness of the composite between the structural plies. The illustrative examples target toughening the composite both within and between the plies, which is different from conventional approaches.

The illustrative examples present the addition of a heating/preforming step under controlled atmospheric pressure after braiding. The level of vacuum or applied pressure, duration and temperature of the heating step can be controlled and varied during this step to adjust the per-ply thickness of the braid. In the illustrative examples, the carbon tows become flattened and this benefits in-plane mechanical properties.

The illustrative examples provide a method that uses less material than prepreg materials. The illustrative examples result in cost savings, and is also better for the environment. The illustrative examples can produce high-performance complex cross-sectional composite structures.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a braided composite product, the method comprising:
    forming a braided carbon structure by braiding together carbon filaments and thermoplastic filaments;
    forming and stabilizing a braided carbon preform by softening the thermoplastic filaments and reducing a thickness of the braided carbon structure, by applying heat and pressure to the braided carbon structure;
    subsequently, infusing the braided carbon preform with a thermoset resin; and
    forming the braided composite product by melting a portion of the thermoplastic filaments while curing the thermoset resin within the braided carbon preform to form the braided composite product.

2. The method of claim 1 wherein braiding together carbon filaments and thermoplastic filaments comprises braiding axial tows and braid tows into the braided carbon structure, at least one of the axial tows or the braid tows comprising the thermoplastic filaments.

3. The method of claim 2, wherein the axial tows or the braid tows comprises 10% by volume of the thermoplastic filaments.

4. The method of claim 1, further comprising repeating applying heat and pressure repeatedly until the braided carbon preform has a desired per-ply thickness.

5. The method of claim 1, wherein the braided carbon preform comprises less than 20% by volume of the thermoplastic filaments.

6. The method of claim 5, wherein partially melting the thermoplastic filaments and mixes thermoplastic material with the thermoset resin and increases a fracture toughness of the braided composite product.

7. The method of claim 5, wherein the braided carbon preform has a smaller per-ply thickness than a per-ply thickness of the braided carbon structure.

8. A method of forming a braided composite product, the method comprising:
    coating axial tows and braid tows with a thermoplastic material;
    braiding the axial tows and the braid tows into a braided carbon structure, at least one of the axial tows or the braid tows comprising thermoplastic filaments, the thermoplastic filaments comprising less than 40% by volume in each of the at least one of the axial tows or the braid tows;
    forming and stabilizing a braided carbon preform by softening the thermoplastic filaments and reducing a thickness of the braided carbon structure, by applying heat and pressure to the braided carbon structure;
    subsequently, infusing the braided carbon preform with a thermoset resin; and
    curing the thermoset resin within the braided carbon preform to form the braided composite product.

9. The method of claim 8, further comprising:
    repeating applying heat and pressure to a per-ply thickness of the braided carbon structure.

10. A method of improving material characteristics of braided carbon materials, the method comprising:
    reducing a per-ply thickness of a braided carbon structure comprising tows comprising less than 40% by volume of thermoplastic filament by applying heat and pressure to the braided carbon structure and forming a braided carbon preform;
    subsequently, infusing the braided carbon preform with a thermoset resin; and
    forming a braided composite product by partially melting a portion of the thermoplastic filaments while curing the thermoset resin within the braided carbon preform.

11. The method of claim 10 further comprising applying the heat and pressure more than once to tailor the per-ply thickness of the braided carbon structure.

12. The method of claim 11, wherein applying the heat and pressure to the braided carbon structure to reduce the per-ply thickness of the braided carbon structure improves in-plane mechanical properties of the braided carbon preform.

13. A method of improving material characteristics of braided carbon materials, the method comprising:
    infusing a braided carbon preform comprising less than 40% by volume of thermoplastic fibers with a thermoset resin; and
    increasing a fracture toughness of a product of the braided carbon preform by applying a heat and pressure during curing the thermoset resin within the braided carbon preform that softens and mixes a portion of the thermoplastic fibers with the thermoset resin infused within the braided carbon preform.

14. A method of forming a braided composite product:
    braiding together carbon filaments and thermoplastic filaments to form a braided carbon structure comprising less than 20% thermoplastic filaments by volume;
    reducing a thickness of the braided carbon structure by applying heat and pressure to the braided carbon structure and forming a braided carbon preform;
    infusing the braided carbon preform with a thermoset resin; and
    forming a toughened braided composite product by applying a heat melting a portion of the thermoplastic filaments and curing the braided carbon preform.

15. The method of claim 8 wherein the braid tows comprise 10% by volume of the thermoplastic filaments.

16. The method of claim 10, further comprising braiding axial tows and braid tows into the braided carbon structure, at least one of the axial tows or the braid tows comprising the thermoplastic filaments.

17. The method of claim 10, wherein the tows comprise braid tows comprising 10% by volume of the respective thermoplastic filaments.

18. The method of claim 10, further comprising repeating applying heat and pressure repeatedly until the braided carbon preform has a desired per-ply thickness.

19. The method of claim 10, wherein the braided carbon preform comprises less than 20% by volume of the thermoplastic filaments.

20. The method of claim 19, wherein partially melting the thermoplastic filaments and mixes thermoplastic material with the thermoset resin and increases a fracture toughness of the braided composite product.

* * * * *